United States Patent
Lipson et al.

(10) Patent No.: US 11,256,031 B2
(45) Date of Patent: Feb. 22, 2022

(54) RESONANCE-FREE LIGHT RECYCLING IN WAVEGUIDES

(71) Applicant: The Trustees of Columbia University in the City of New York, New York, NY (US)

(72) Inventors: Michal Lipson, New York, NY (US); You-Chia Chang, New York, NY (US); Samantha P. Roberts, Ithica, NY (US); Brian Stern, New York, NY (US); Utsav D. Dave, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/626,616

(22) PCT Filed: Jun. 26, 2018

(86) PCT No.: PCT/US2018/039546
§ 371 (c)(1),
(2) Date: Dec. 26, 2019

(87) PCT Pub. No.: WO2019/005826
PCT Pub. Date: Jan. 3, 2019

(65) Prior Publication Data
US 2020/0225415 A1    Jul. 16, 2020

Related U.S. Application Data

(60) Provisional application No. 62/524,901, filed on Jun. 26, 2017.

(51) Int. Cl.
*G02B 6/14* (2006.01)
*F21V 8/00* (2006.01)
(Continued)

(52) U.S. Cl.
CPC ............. *G02B 6/14* (2013.01); *G02B 6/0046* (2013.01); *G02F 1/01* (2013.01); *G02F 1/295* (2013.01)

(58) Field of Classification Search
None
See application file for complete search history.

(56) References Cited

U.S. PATENT DOCUMENTS

| | | | |
|---|---|---|---|
| 5,513,283 A | 4/1996 | Whang et al. | |
| 6,269,205 B1 * | 7/2001 | Peral | G02B 6/14 385/11 |

(Continued)

FOREIGN PATENT DOCUMENTS

WO    2019/005826 A1    1/2019

OTHER PUBLICATIONS

Baba et al., "Slow-light Mach-Zehnder modulators based on Si photonic crystals", Science and Technology of Advanced Materials, 2014, 15, 024602, 11 pages.

(Continued)

*Primary Examiner* — Chad H Smith
(74) *Attorney, Agent, or Firm* — BakerHostetler

(57) ABSTRACT

Light recycling within a waveguide is achieved by mode conversion instead of resonance. A structure is provided in in which light makes multiple passes through the same waveguide by converting the mode to a different mode after each pass and rerouting the light back into the same waveguide. The structure includes a bus waveguide and at least one mode converter device disposed at or adjacent each of two opposing ends of the bus waveguide, wherein each mode converter devices is configured to receive light having a receiving mode along a first direction and to cause light having a different mode from the receiving mode to propagate in a second direction opposite the first direction.

20 Claims, 10 Drawing Sheets

(51) Int. Cl.
*G02F 1/01* (2006.01)
*G02F 1/295* (2006.01)

(56) References Cited

U.S. PATENT DOCUMENTS

| | | | |
|---|---|---|---|
| 6,628,861 B1* | 9/2003 | Yao | G02B 6/02071 |
| | | | 385/24 |
| 7,292,751 B2 | 11/2007 | Popovic | |
| 7,497,581 B2 | 3/2009 | Beeson et al. | |
| 2004/0202430 A1 | 10/2004 | Scheuer et al. | |
| 2008/0128728 A1 | 6/2008 | Nemchuk et al. | |
| 2008/0193080 A1 | 8/2008 | Cheben et al. | |
| 2017/0276873 A1* | 9/2017 | Hu | G02B 6/29338 |

OTHER PUBLICATIONS

Bogaerts W, De Heyn P, Van Vaerenbergh T, De Vos K, Kumar Selvaraja K, Claes T, Dumon P, Bienstman P, Van Thourhout D, Baets R. Silicon microring resonators. Laser & Photonics Reviews. Sep. 2011; 6(1): pp. 47-73.

Chang et al., "Resonance-Free Light Recycling in Waveguides", CLEO: Science and innovations 2017, May 2017.

Ding et al., "On-chip two-mode division multiplexing using tapered directional coupler-based mode multiplexer and demultiplexer," Opt. Express 21, 10376-10382 (2013).

Dong et al., "Wavelength-tunable silicon microring modulator", Optics Express, May 2010, vol. 18, No. 11, 10941-10946.

Luo et al. disclosed in "WDM-compatible mode-division multiplexing on a silicon chip," Nature Communications, Jan. 15, 2014, 1-7.

Patel et al., "High-speed compact silicon photonic Michelson interferometric modulator", Optics Express, Nov. 2014, vol. 22, No. 22, 26788-26802.

Romero-García et al., "High-speed resonantly enhanced silicon photonics modulator with a large operating temperature range", Optics Letters, Jan. 2017, vol. 42, No. 1, 81-84.

Tu et al., "Silicon optical modulator with shield coplanar waveguide electrodes", Optics Express, Sep. 2014, vol. 22, No. 19, 23724-23731.

Wang et al., "On-chip silicon 8-channel hybrid (de)multiplexer enabling simultaneous mode- and polarization-division-multiplexing," Laser & Photonics Reviews, 8: L18-L22, 2014.

* cited by examiner

RESONANCE-FREE LIGHT RECYCLING IN WAVEGUIDES

CROSS-REFERENCE TO RELATED APPLICATIONS

This application is the National Stage Application of International Patent Application No. PCT/US2018/039546 filed Jun. 26, 2018, which claims priority from U.S. Provisional Patent Appl. Ser. No. 62/524,901, filed Jun. 26, 2017, the disclosures of each of which are incorporated herein by reference in their entireties for any and all purposes.

GOVERNMENT RIGHTS

This invention was made with Government support under DARPA-BAA-16-13 awarded by DOD/DARPA. This invention was also made with Government support under N00014-16-2219 awarded by DOD/ONR. The Government has certain rights in the invention.

TECHNICAL FIELD

Systems and methods are described for recycling light within a waveguide using mode conversion instead of resonance for use in creating large phase shifts, decreasing power consumption, reducing footprints, enhancing sensing signals, and the like.

BACKGROUND

Light recycling is important for integrated photonics because the change of refractive index, which can be created by thermo-optic, electro-optic or other effects, is often very small. As a result, a very long length is required to accumulate the small change of refractive index. This also results in inefficiency in electrically-driven active photonic devices because a great amount of electrical power is consumed in order to create the change over the entire length. Light recycling can greatly reduce the required length and the power consumption by allowing the light to pass the same waveguide multiple times. Light recycling is thus particularly useful for applications that typically require a very long length in order to accumulate small index changes. For example, depletion-type phase shifters, which typically need lengths on the order of millimeters to achieve a phase shift of $7r$, can be greatly reduced in size through the use of light recycling.

In conventional methods, light recycling is achieved using resonators such as micro-rings, micro-disks, and Fabry-Perot cavities. When light enters a resonator, it circulates multiple round trips before leaving the resonator. However, due to the nature of resonance, light recycling based resonators operate only within a narrow bandwidth near the resonance frequency. In these conventional methods there is a tradeoff between the number of recycling round trips and the bandwidth, which limits many applications.

In another prior art example, Luo et al. disclosed in "WDM-compatible mode-division multiplexing on a silicon chip," Nature Communications, Jan. 15, 2014, pp 1-7, a micro-ring based demonstration of an on-chip WDM-compatible mode-division multiplexing scheme implementing selective coupling to different spatial modes at different wavelengths. It is shown that for a given silicon waveguide a large range of effective indices from 2.0 to 2.9 can be achieved corresponding to propagation constants of the $TE_0$ (transverse electric) through $TE_4$ spatial modes at $\lambda=1550$ nm. On the basis of the propagation constant matching, an optical mode in a single-mode waveguide can be evanescently coupled to a specific spatial mode in an adjacent multimode waveguide, in which the coupling to the mode depends on the width of the multimode waveguide.

It is desired to use such mode conversion techniques to replace resonance for recycling light within a waveguide to avoid the tradeoffs of conventional resonators.

SUMMARY

In the method and systems described herein, the light recycling within a waveguide is achieved by mode conversion instead of resonance. A structure is provided in which light makes multiple passes through the same waveguide by converting the mode to a different mode after each pass and rerouting the light back into the same waveguide. This approach takes advantage of high index contrast waveguides, in which a large separation between the effective indexes of different modes allows rerouting of the light without cross-talk or interference. Because of the orthogonality between different spatial modes, there is no interference between the circulating modes, which avoids the optical bandwidth reduction associated with interference. This approach is inherently broadband, providing a bandwidth not achievable by the conventional methods such as micro-rings and micro-disks. The broadband approach enables a seven-fold increase in the phase shift of compact integrated interferometers in exemplary embodiments.

In an example, an integrated multipass photonic device comprises a bus waveguide; and at least one mode converter device disposed at or adjacent each of two opposing ends of the bus waveguide, wherein each mode converter devices is configured to receive light having a receiving mode along a first direction and to cause light having a different mode from the receiving mode to propagate in a second direction opposite the first direction. As used herein, adjacent means on or in proximity to and does not foreclose intervening layers including air or fluid.

In an exemplary embodiment, a method of recycling light is provided comprising the steps of inserting light having an input mode into a first end of a bus waveguide for propagation to a second end of the bus waveguide, converting the mode of the light to a different mode at the second end of the bus waveguide and reinserting the converted light into the bus waveguide for propagation in an opposite direction, converting the mode of the light to a different mode at the first end of the bus and reinserting the converted light into the bus waveguide for propagation in an opposite direction, and removing the converted light from the bus waveguide. In an exemplary embodiment, the mode of the light is up-converted at the first and second ends of the bus waveguide, and the up-converting and reinserting may be repeated a predetermined number of times. However, those skilled in the art will appreciate that it is not necessary to up-convert the mode. The same method can be done by down-converting the mode, or using any other conversion of the mode, as long as the mode is different.

In exemplary embodiments, a recycling structure includes a bus waveguide with mode converters at respective ends thereof for converting light from an input mode (e.g., $TE_0$) to another mode and reinserting the converted light into the bus waveguide in the opposite direction. After the light has been converted and recycled for a desired number of passes, the converted light is dropped off from the bus waveguide by a directional coupler.

In further exemplary embodiments, the mode converters include two directional couplers. The bus waveguide is designed to vary in width such that the phase matching condition of the first directional coupler is satisfied only for the $TE_{i+1}$ mode of the bus waveguide, while the second directional coupler is designed to phase-match only the $TE_i$ mode of the bus waveguide. The two directional couplers are connected such that the light is picked up by the second directional coupler and is routed back to the first directional coupler. The light therefore returns to the bus waveguide with a promoted mode and a reversed direction. In still other exemplary embodiments, a width of the bus waveguide and a width of a narrow access waveguide of the directional couplers are tapered slowly to provide an adiabatic condition.

BRIEF DESCRIPTION OF THE DRAWINGS

The above and other objects and advantages of the invention will be apparent to those skilled in the art based on the following detailed description in conjunction with the appended figures, of which.

DETAILED DESCRIPTION OF ILLUSTRATIVE EMBODIMENTS

Figure 1:
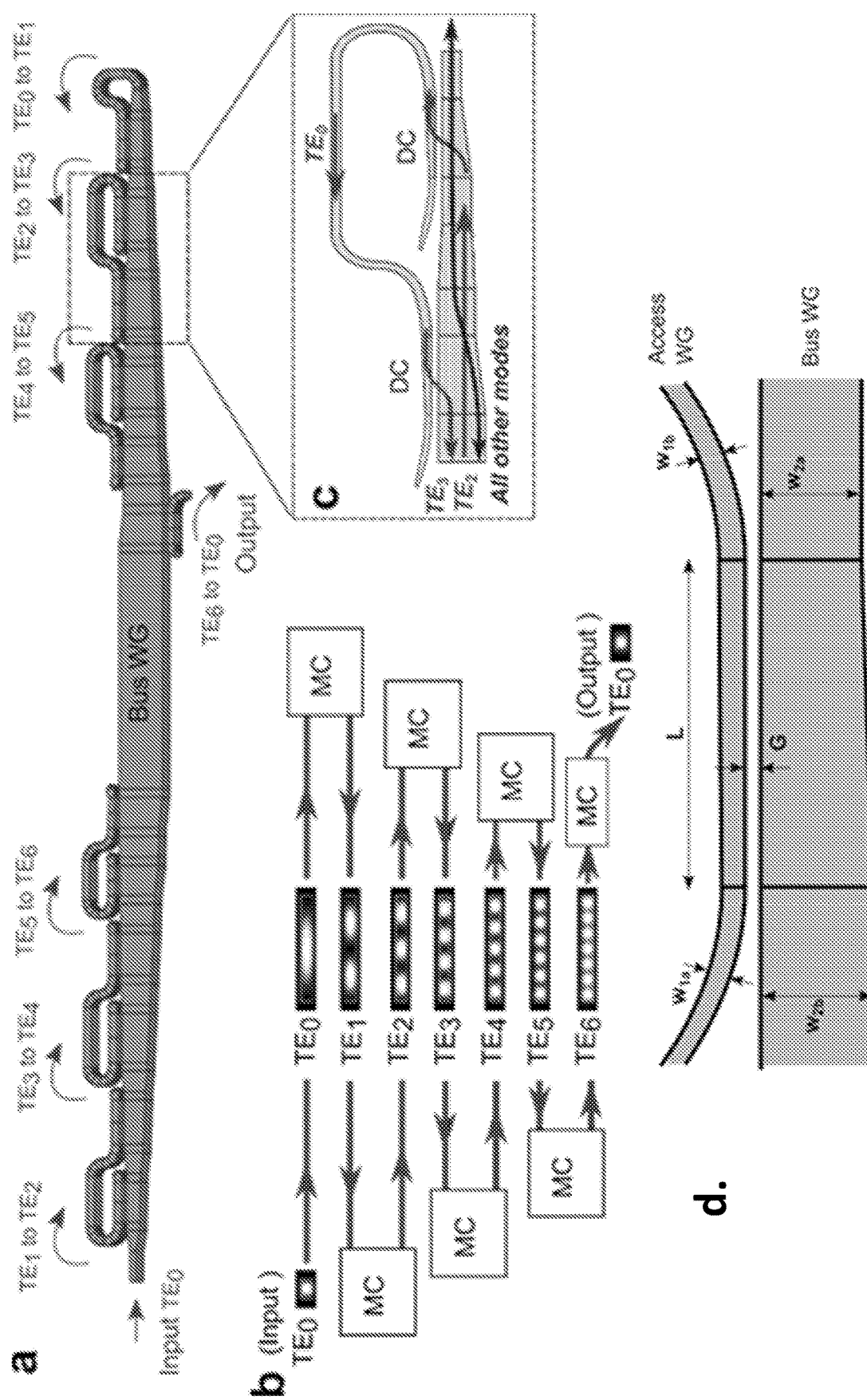
FIG. 1(a) illustrates an exemplary embodiment of a 7-pass recycling structure based on consecutive mode conversion.
FIG. 1(b) illustrates a schematic of the recycling path.
FIG. 1(c) illustrates a mode converter used in the recycling structure in an exemplary embodiment.
FIG. 1(d) illustrates an exemplary directional coupler used in the mode converter of FIG. 1(c).

An exemplary embodiment of a method and device for recycling light without resonance is described below with respect to FIGS. 1-3. Those skilled in the art will appreciate that the methods and devices described are for exemplary purposes only and are not limited to the specific methods and devices described.

The present disclosure includes at least the following aspects:

Aspect 1: A method comprising: causing light having an input mode to propagate in a bus waveguide along a first direction, wherein the bus waveguide has a first end and a second end opposite the first end; converting the input mode of the light to a second mode at or adjacent the second end of the bus waveguide and causing the light having the second mode to propagate along a second direction; converting the second mode of the light to a third mode at or adjacent the first end of the bus waveguide and causing the light having the third mode to propagate along the first direction; and removing light from the bus waveguide.

Aspect 2: A method of aspect 1, wherein the mode of the light is up-converted at or adjacent one or more of the first end or second end of the bus waveguide.

Aspect 3: A method of aspect 1, wherein the mode of the light is down-converted at or adjacent one or more of the first end or second end of the bus waveguide.

Aspect 4: A method of any one of aspects 1-3, wherein the converting steps are repeated a predetermined number of times.

Aspect 5: A method of any one of aspects 1-4, wherein the input mode is orthogonal to the second mode.

Aspect 6: A method of any one of aspects 1-5, wherein the second mode is orthogonal to the third mode.

Aspect 7: A method of any one of aspects 1-6, wherein one or more of the input mode, second mode, and third mode comprises one or more of a spatial distribution, a polarization, or wavelength that is specific to the one or more of the input mode, second mode, and third mode and different from the others of the input mode, second mode, and third mode.

Aspect 8: An integrated multipass photonic device comprising: a bus waveguide; and at least one mode converter device disposed at or adjacent each of two opposing ends of the bus waveguide, wherein each mode converter devices is configured to receive light having a receiving mode along a first direction and to cause light having a different mode from the receiving mode to propagate in a second direction opposite the first direction.

Aspect 9: The device of aspect 8, wherein one or more of the mode converter devices comprises first and second directional couplers connected such that light is picked up by the second directional coupler and is routed back to the first directional coupler and returned to the bus waveguide with a different mode and a reversed direction.

Aspect 10: The device of aspect 9, wherein the bus waveguide varies in width such that a phase matching condition of the first directional coupler is satisfied only for a TE-ri mode of the bus waveguide, while the second directional coupler has a phase-matching condition only for a TE mode of the bus waveguide.

Aspect 11: The device of aspect 10, wherein a width of the bus waveguide and a width of a narrow access waveguide of the directional couplers are varied along the direction of propagation to provide an adiabatic condition.

Aspect 12: The device of aspect 10, wherein the variation of the width of the bus waveguide and the width of a narrow access waveguide of the directional couplers is linear.

Aspect 13: The device of aspect 10, wherein the variation of the width of the bus waveguide and the width of a narrow access waveguide of the directional couplers is non-linear.

Aspect 14: The device of aspect 10, wherein the variation of the width of the bus waveguide and the width of a narrow access waveguide of the directional couplers is based on a pre-determined function.

Aspect 15: The device of aspect 10, wherein a narrow access waveguide of the directional couplers is based on a subwavelength grating.

Aspect 16: The device of any one of aspects 8-15, wherein the device comprises a multilayer construction of differing materials.

Aspect 17: The device of any one of aspects 8-15, wherein one or more of the mode converter devices comprises of one or more gratings.

Aspect 18: The device of any one of aspects 8-15, wherein one or more of the mode converter devices comprises of one or more electro-optic modulators.

Aspect 19: The device of any one of aspects 8-15, wherein one or more of the mode converter devices comprises of one or more polarization converters.

Aspect 20: The device of any one of aspects 8-15, wherein one or more of the mode converter devices comprises of one or more nonlinear elements.

An example of a recycling structure that allows 7 recycling times is plotted in FIG. 1(a). As illustrated in FIG. 1(a), a bus waveguide is provided with a varying width and several mode converters based on selective phase matching in directional couplers. In FIG. 1(a), the tapered region provides the mode conversion and the light coupling. FIG. 1(b) is a schematic of the recycling path, showing how the light is recycled. As shown, light enters the recycling structure with a fundamental transverse electric ($TE_0$) mode. After passing through the bus waveguide the first time, the light is converted from the $TE_0$ mode to the $TE_1$ mode by a mode converter, and sent back the to the bus waveguide in the backward direction. Similarly, after reaching the other end of the bus waveguide, the light is converted again from the $TE_1$ mode to the $TE_2$ mode, and sent back to the bus waveguide in the forward direction. As a result, light is recycled back and forth 7 times as the mode is promoted consecutively. Eventually, the mode order reaches $TE_6$ and the light is dropped off from the bus waveguide by a directional coupler and converted to the same $TE_0$ input mode. The same principle can be generalized to design other recycling structures with a different numbers of passes.

FIG. 1(c) illustrates a mode converter used in the recycling structure in an exemplary embodiment to convert the $TE_2$ mode to the $TE_3$ mode. As illustrated, the mode converter includes two directional couplers. The bus waveguide is designed to vary in width such that the phase matching condition of the second directional coupler on the right hand side is satisfied only for the $TE_2$ mode of the bus waveguide, while the first directional coupler on the left hand side is designed to phase-match only the $TE_3$ mode of the bus waveguide. The two directional couplers are connected such that the light is picked up by the second directional coupler and is routed back to the first one. The light therefore returns to the bus waveguide with a promoted mode and a reversed direction.

Those skilled in the art will appreciate that the efficiency of directional couplers is significant because they are cascaded. Although the efficiencies of conventional interference-based directional couplers can be 100% efficient in theory, they are often low in practice because of the sensitivity to fabrication variations. To allow larger tolerance to fabrication variations, the directional couplers in exemplary embodiments are designed to use adiabatic coupling. This relaxes the requirement for exact phase matching and increases the conversion efficiency. FIG. 1 (d) shows the geometry of the adiabatic directional coupler. Table 1 shows the dimensions of the directional couplers used in an exemplary embodiment. The narrow access waveguide is in the $TE_0$ mode. The radius of the arc is 130 μm. The height of the silicon waveguide is 250 nm.

TABLE 1

| Mode in the access waveguide | Mode in the bus waveguide | $w_{1a}$ (μm) | $w_{1b}$ (μm) | $w_{2a}$ (μm) | $w_{2b}$ (μm) | G (μm) | L (μm) |
|---|---|---|---|---|---|---|---|
| $TE_0$ | $TE_1$ | 0.32 | 0.36 | 0.67 | 0.76 | 0.1 | 19.8 |
| $TE_0$ | $TE_2$ | 0.32 | 0.36 | 1.03 | 1.15 | 0.1 | 23 |
| $TE_0$ | $TE_3$ | 0.32 | 0.36 | 1.39 | 1.55 | 0.1 | 26.8 |
| $TE_0$ | $TE_4$ | 0.31 | 0.35 | 1.73 | 1.91 | 0.1 | 25.8 |
| $TE_0$ | $TE_5$ | 0.28 | 0.32 | 1.98 | 2.11 | 0.1 | 20.2 |
| $TE_0$ | $TE_6$ | 0.275 | 0.315 | 2.32 | 2.44 | 0.13 | 24.9 |

Figure 2A:
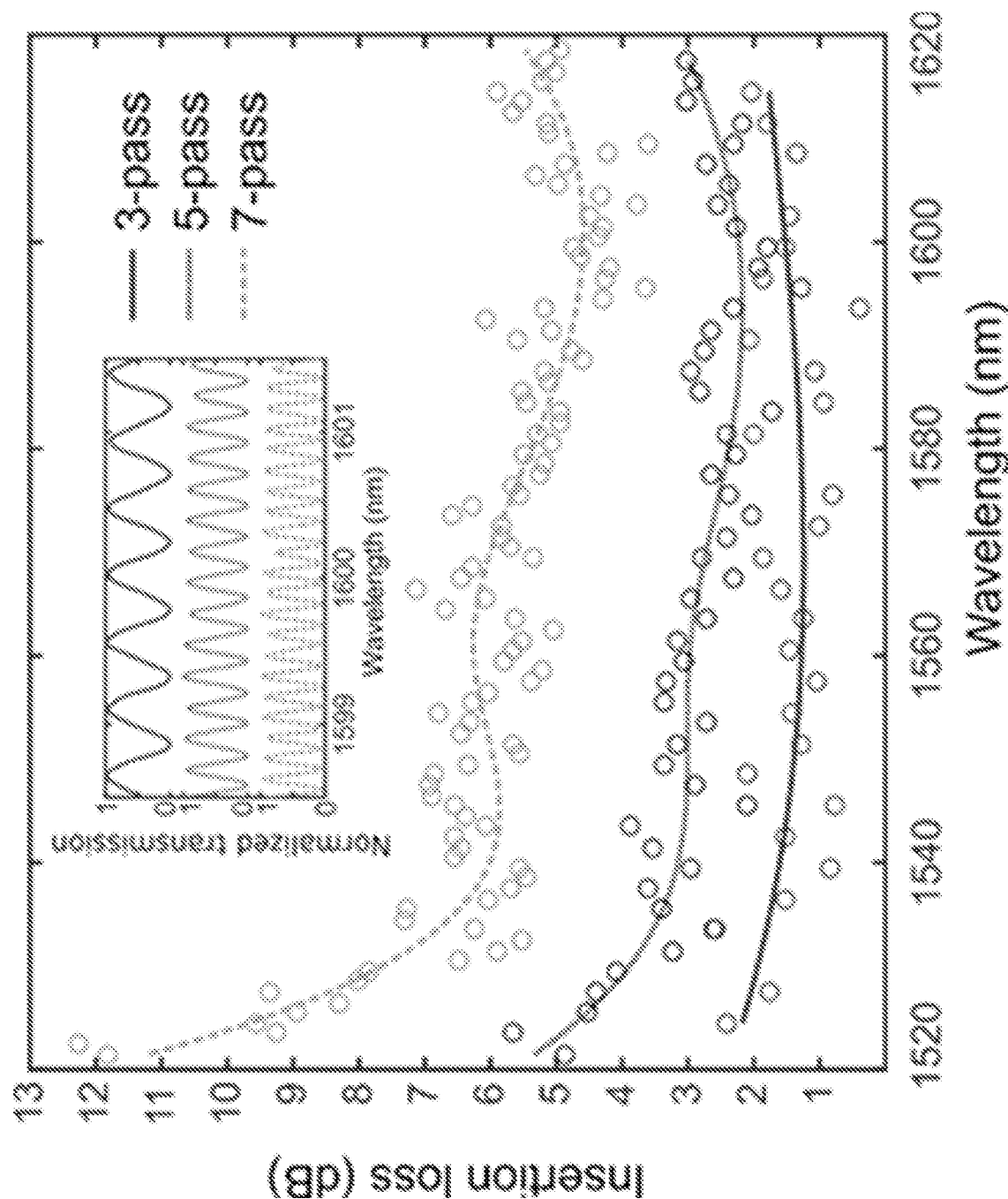
FIG. 2(a) illustrates the measured insertion losses of the 3-pass, 5-pass and 7-pass recycling structures.
Figure 2B:
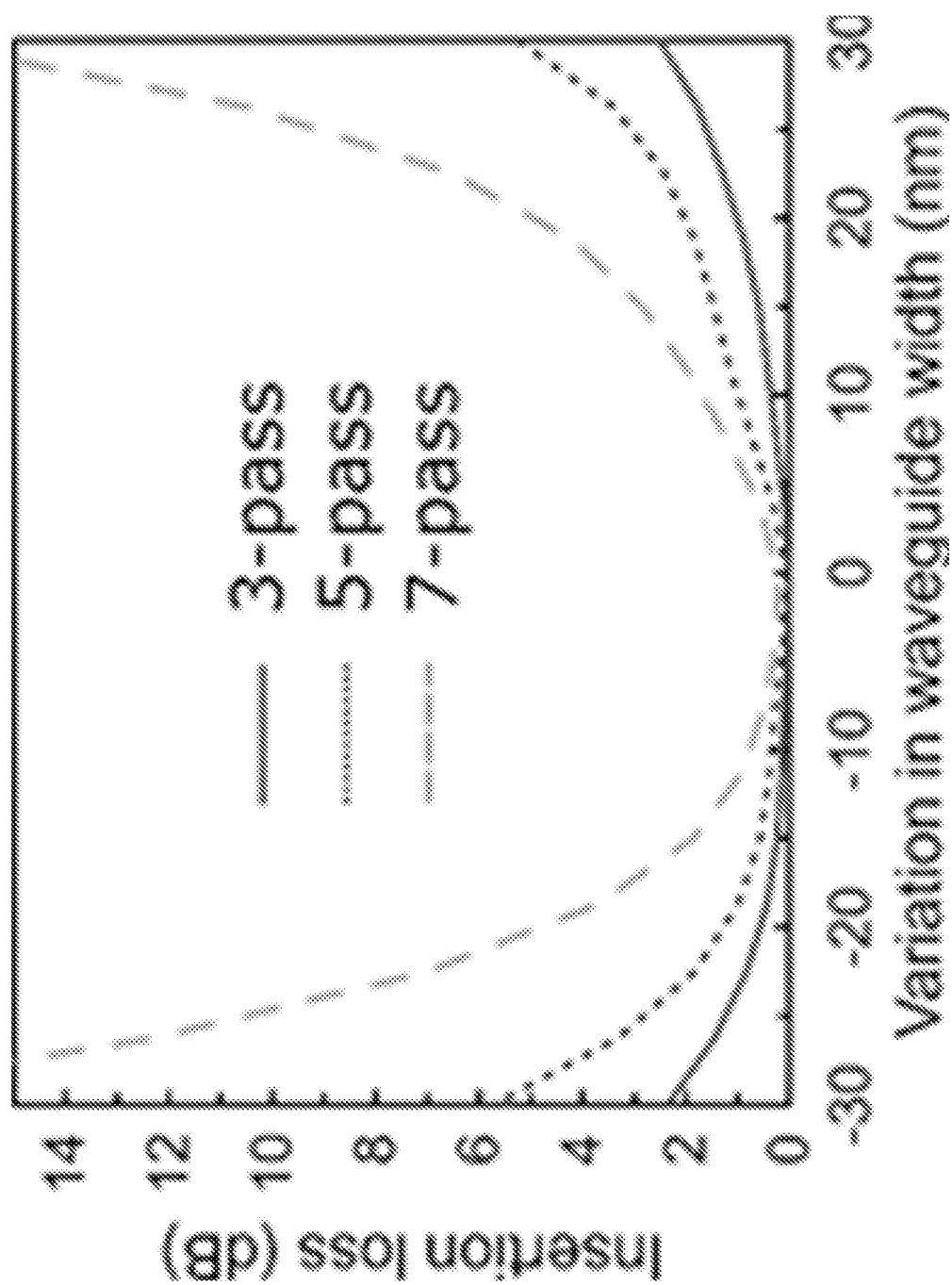
FIG. 2(b) illustrates the simulated insertion losses as functions of the variation in the access waveguide width.

The measured insertion losses of the 3-pass, 5-pass and 7-pass recycling structures is shown in FIG. 2 (a). One can see that the 3-dB bandwidths, in which the insertion losses remain less than 3 dB above the minimums, are at least 100 nm for all structures. The inset shows the measured transmission spectra of the MZIs with different recycling structures. One can see that the free spectral range of the interference fringes decreases as the number of passes increases, demonstrating an increase of the optical path length due to light recycling.

FIG. 2 (b) illustrates the simulated fabrication tolerance of the designed recycling structures. As illustrated, the simulated insertion losses remain less than 0.6 dB, 1.5 dB, and 2.8 dB for the 3-pass, 5-pass and 7-pass recycling, respectively, if the dimensional variation is controlled within ±15 nm.

Figure 3A:
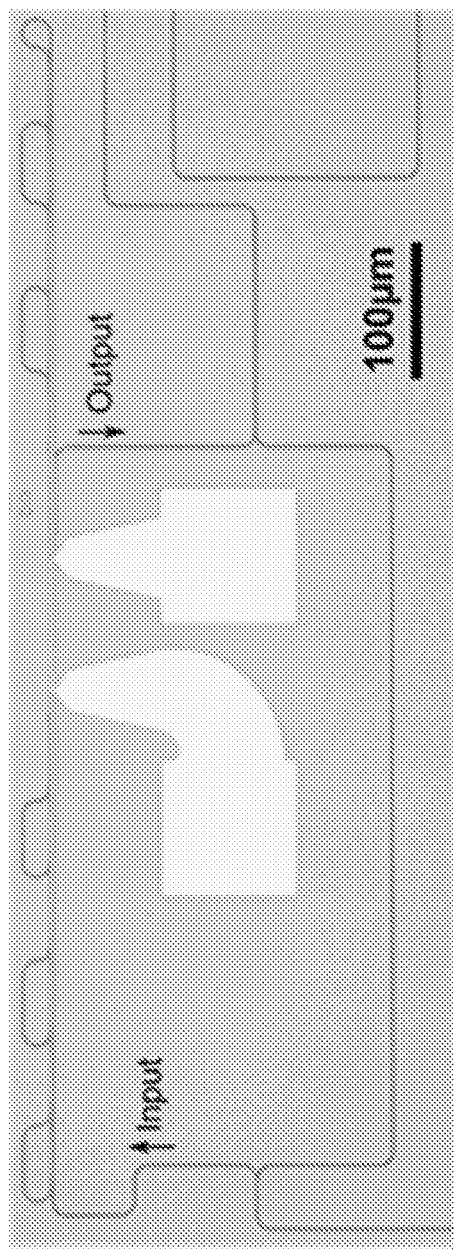
FIG. 3(a) illustrates an optical microscope picture of a heater-based phase shifter enhanced by a 7-pass recycling structure in an exemplary embodiment.
Figure 3B:
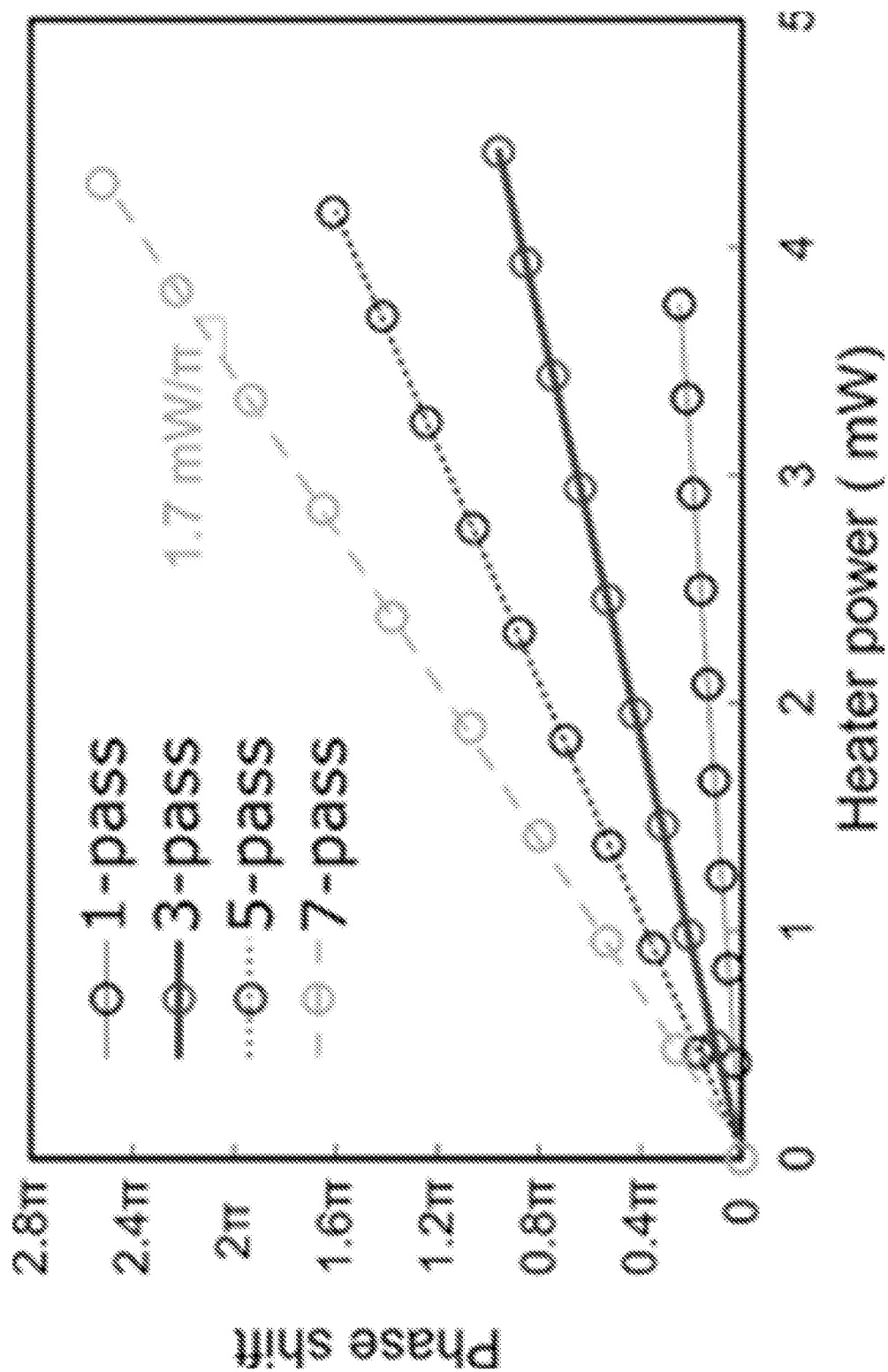
FIG. 3(b) illustrates the measured phase shift for different number of recycling times.

FIG. 3 demonstrates experimental results of an application of the recycling structure for enhancing phase shifts. As shown in FIG. 3(a), a heater-based phase shifter is placed on top of the bus waveguide of the recycling structure. The phase shift created by the heater-based phase shifter is measured with a Mach-Zehnder interferometer. The experiment is repeated for recycling structures with 3-time, 5-time, and 7-time recycling, as well as a phase shifter without recycling. FIG. 3(b) shows the measured phase shift as a function of heater power, which shows an enhancement of phase shifts with the number of recycling. The efficiency of the phase shifter, characterized by the power needed to create a π phase shift, is improved from 15.4 mW/π with no recycling to 1.7 mW/π with 7 times of recycling.

Those skilled in the art will appreciate that the system and method described herein has many applications including light detection and ranging (LIDAR) applications such as beam steering without movable mirrors, sensors for self-driving vehicles, and the like. In such applications, the phase of different parts of a beam can be shifted by different amounts to provide beam steering. The optical properties may also be changed by heating the material as in the embodiment of FIG. 3; however, it will be appreciated that the methods described herein allow the amount of power required to heat the material to be significantly reduced, for example, a factor of 10 less power due to light recycling. Those skilled in the art will further appreciate that the methods described herein may be used with other ways to change optical properties and other ways to provide low power modulators for sending data over waveguides or optical fibers. Those skilled in the art will also appreciate that the methods described herein may be used with other ways to enhance the sensitivity of biosensors, chemical sensors, and spectrometers. Those skilled in the art will also appreciate that the methods described herein may be used with other ways to decrease the footprint of delay lines. Those skilled in the art will also appreciate that the methods described herein may be used with other ways to enhance the efficiency of light emitting, absorption and amplification.

One of the most under-utilized resources in integrated photonics today is the highly multimodal nature of high index contrast waveguides in platforms such as silicon-on-insulator (SOI). Since each individual waveguide mode is by definition orthogonal to all the others, one could treat it as a completely independent channel. Thus, by coupling to several different modes within a single multimode waveguide one can open up the potential for highly multiplexed operations in these waveguides. For example, this could boost the information carrying capacity of integrated platforms for communications, allow for high throughput and multi-variable sensing, quantum information etc. One of the most difficult challenges in exploiting this resource is to be able to excite very high order modes (HOMs) on-chip—reliably, and with low insertion loss. Typically, in order to excite a particular high order mode in a multimode waveguide, asymmetric directional couplers (ADCs), where the individual modes in two waveguides positioned close enough to each other such that their evanescent fields overlap and thus couple to each other are used. Until now, all demonstrations showing high order modes have only shown coupling to a few orders above the fundamental. This is because as the mode order gets larger, the separation between successive modes in terms of their effective index gets progressively smaller. This results in unwanted coupling to other nearby high order modes in the presence of small perturbations arising from the inevitable fabrication errors. Here, we show that by carefully exploiting the analogy between the coupled mode theory (which describes the coupling between different waveguide modes) and the theory of adiabatic atomic transitions driven by electromagnetic radiation, one can achieve robust and low-loss coupling to very high order modes (up to the tenth order transverse electric mode) in high index contrast waveguides.

To overcome the problem of low tolerance to fabrication errors in directional couplers we employed an efficient adiabatic evolution by carefully controlling the shape of the coupled waveguides. Such a system is described by the following coupled equations:

$$\frac{d}{dz}\begin{pmatrix}A_1\\A_2\end{pmatrix} = -i\begin{pmatrix}\Delta & \kappa\\ \kappa & -\Delta\end{pmatrix}\begin{pmatrix}A_1\\A_2\end{pmatrix} \quad (1)$$

Here, $A_1$ and $A_2$ are the modal amplitudes in the two waveguides, κ is the coupling between the two modes (which can be calculated from the overlap between their evanescent tails) and Δ is the phase mismatch between them given by $(\beta_1-\beta_2)/2$, where and are the modal propagation constants. By replacing the longitudinal variable z with time, these same equations also describe an atomic transition in a two-level system. From studies of such transitions, it is known that the adiabatic atomic transition can made be more efficient and robust by properly designing the evolution of κ and Δ. We employ the Allen-Eberly (AE) scheme which is used in the field of atomic transitions because it is more adiabatic than the traditional linear transition scheme for designing our κ(z) and Δ(z) for the purposes of mode conversion of the ADC (where the waveguides are linearly tapered), thus allowing for coupling to very high order modes. Out of the class of many functions within the AE scheme [as detailed in the paper Vitanov, N. V., and B. M. Garraway. "Landau-Zener model: Effects of finite coupling duration." *Physical Review A* 53.6 (1996): 4288], one particular κ(z) and Δ(z) employed for demonstration are as follows:

$$\kappa(z) = \pi\kappa_0 \left|z\right|/\left(2z_0\sqrt{e^{(\pi z/2z-0)^2}-1}\right); \Delta(z) = \Delta_0 z \quad (2)$$

Figure 4:
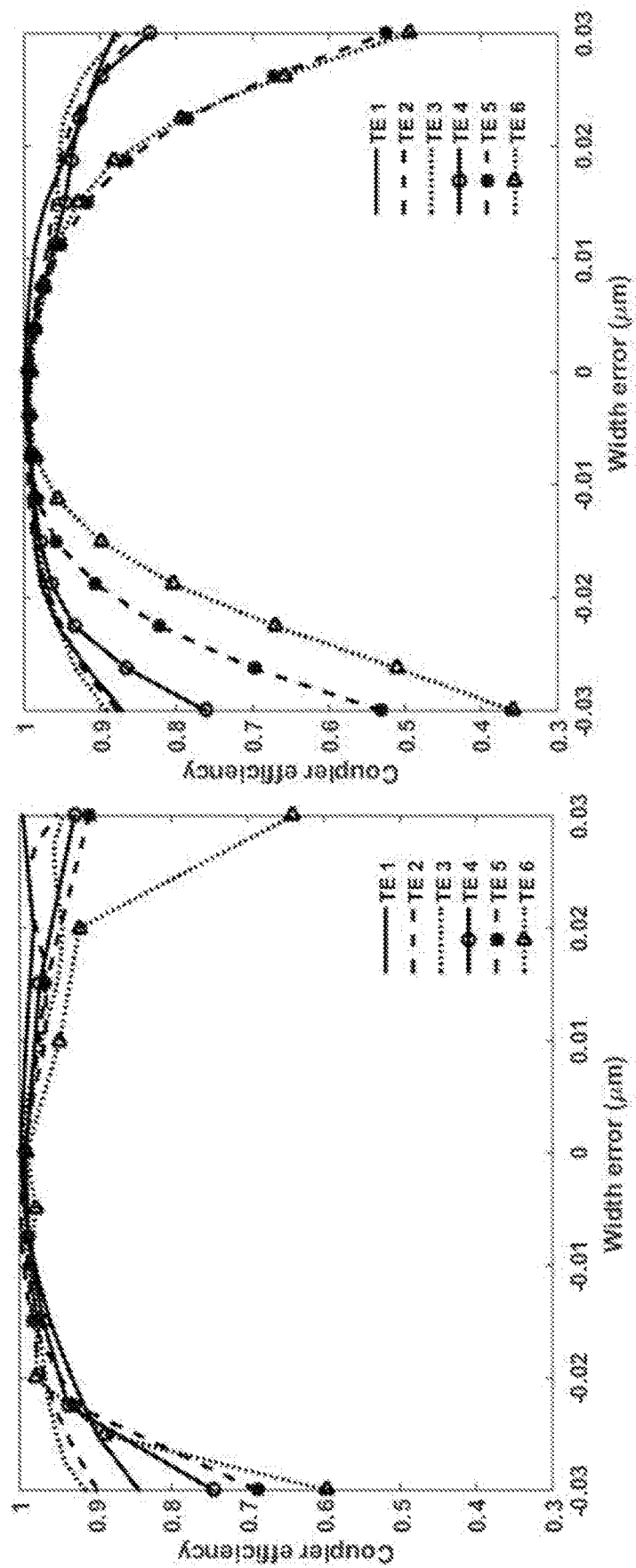
FIG. 4(a) illustrates simulated tolerance of various high order couplers to fabrication error of single mode waveguide width using the Allen-Eberly scheme and (b) using the traditional design with linear waveguide tapers and a constant gap.
Figure 5:
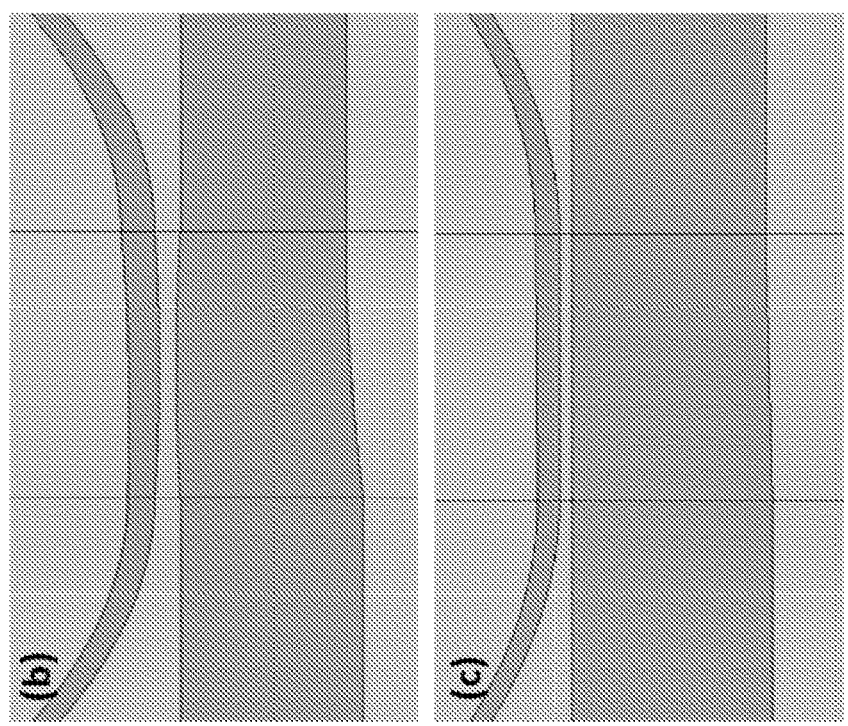
FIG. 5(a) illustrates the tolerance of the Allen-Eberly adiabatic mode converter remains within acceptable range even for very high order modes up to TE10. Schematics for the Allen-Eberly (b) and the linear (c) designs for adiabatic mode conversion from the fundamental to higher order modes. The AE scheme only involves slight curving of the waveguides, and delivers far more robustness with the same minimum/maximum feature sizes as the linear design.
Figure 5:
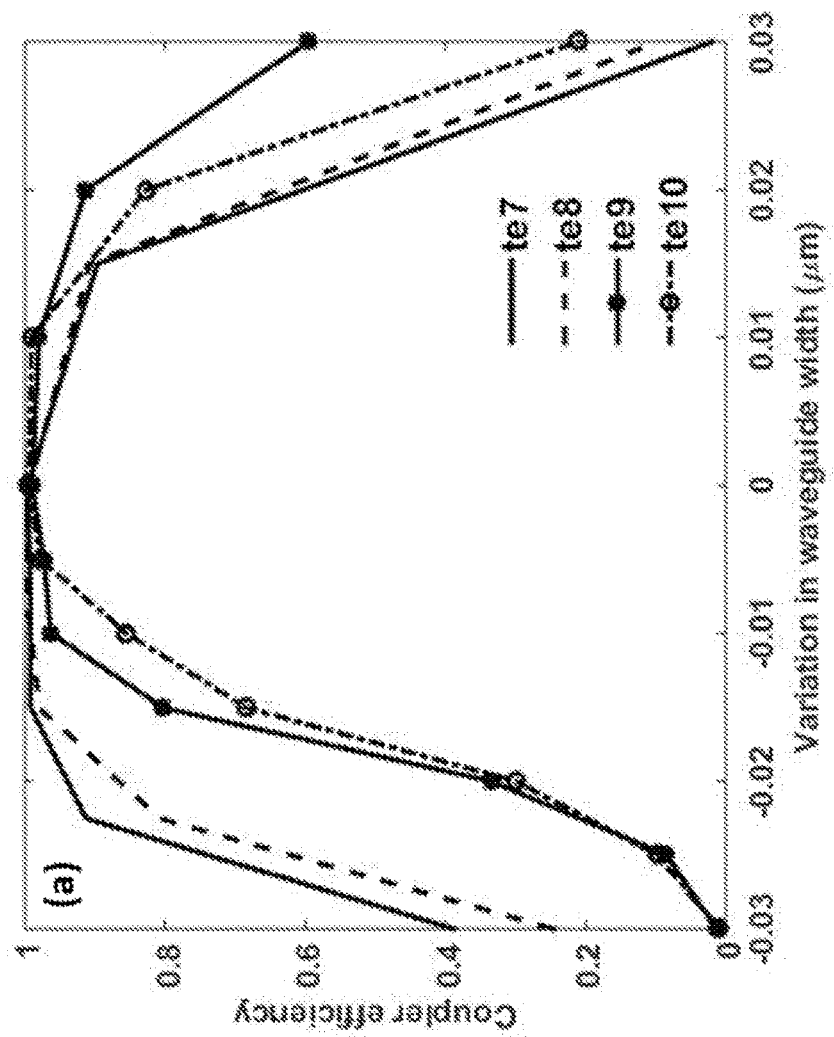
Figure 6:
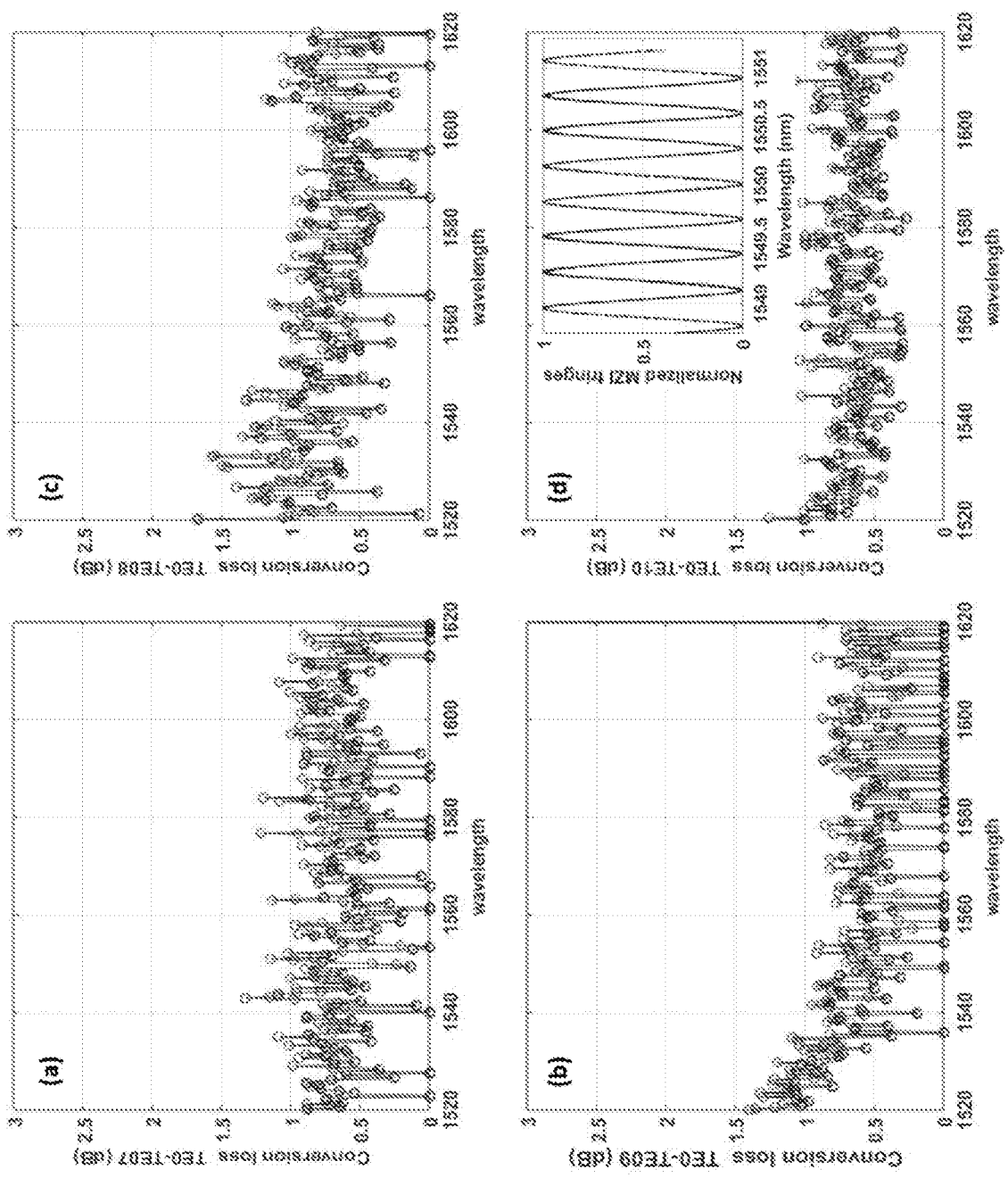
FIG. 6 illustrates experimentally measured modal conversion efficiencies from fundamental to (a) mode TE7, (b) TE8, (c) TE9 and (d) TE10. Inset: The normalized fringes as measured from a Mach-Zhender interferometer in which one arm had mode conversion from TE0 to TE10 and back. The mode conversion loss was extracted from the fringe visibility of the MZI.

Here, $\kappa_0$ and $\Delta_0$ are the maximum coupling and mismatch, and zo is the half-length of the ADC. From these, the geometric parameters of the design like the waveguide widths and the gap between them can be extracted. FIG. 4(a) below shows the simulated tolerance of ADCs for various high order modes with respect to the most sensitive design parameter (which in this case is the width of the single mode waveguide). FIG. 4(b) shows the same for the more traditional linear adiabatic designs. It is clear that the Allen-Eberly scheme clearly is far more robust and thus allows for very high order mode couplings, the simulated tolerances for which are shown in FIG. 5(a) for modes up to the tenth order mode (TE10). Note that the minimum feature sizes required for the AE design are no more demanding than for the linear adiabatic designs. This can be seen from FIGS. 5(b) and (c) where schematics for the AE and the linear designs are shown for comparison. The smallest width, minimum gap and the largest length for any ADCs up to TE10 were 290 nm, 100 nm and 100 μm respectively, showing that these designs are very reasonable in terms of fabrication or on-chip real estate. Finally, the experimentally measured conversion efficiencies for the very high order modes from TE7 to TE10 are shown in FIG. 6. The efficiency is extracted by measuring the visibility of Mach-Zhender fringes where one arm of the interferometer had mode conversion from the fundamental to the higher order and back. Clearly, all the ADCs have less than 1 dB loss within at least a 100 nm bandwidth. The parameters for the ADCs for various high order modes are given in Table 2.

TABLE 2

| Mode in the access waveguide | Mode in the bus waveguide | $w_{1a}$ (μm) | $w_{1b}$ (μm) | $w_{2a}$ (μm) | $w_{2b}$ (μm) | $G_{min}$ (μm) | L (μm) | Arc radius (μm) |
|---|---|---|---|---|---|---|---|---|
| $TE_0$ | $TE_7$ | 0.300 | 0.330 | 2.85 | 2.75 | 0.15 | 36.2 | 200 |
| $TE_0$ | $TE_8$ | 0.290 | 0.335 | 3.145 | 3.12 | 0.15 | 37.6 | 200 |
| $TE_0$ | $TE_9$ | 0.290 | 0.330 | 3.6 | 3.5 | 0.18 | 56.5 | 250 |
| $TE_0$ | $TE_{10}$ | 0.290 | 0.335 | 3.92 | 3.89 | 0.18 | 69 | 250 |

A second approach for achieving robust mode conversion involves replacing the narrower waveguide (corresponding to the fundamental mode) with a subwavelength grating (SWG) based waveguide. The SWG is periodic grating structure whose period is significantly smaller than the wavelength. Because of this, the light behaves as if it were in an effective medium whose refractive index is between that of the core (in this case silicon) and the cladding (in this case, silicon dioxide) indices, thus lowering the index contrast. This approach allows for delocalizing the fundamental waveguide mode because of the lowered index contrast without having to fabricate very narrow waveguides, which are very sensitive to small fabrication errors because of the high index contrast. For TE polarized modes, the index of the effective medium $n_{em}$ is the mean of the two refractive indices, weighted by the duty cycle f.

$$n_{em} = f \cdot n_{core} + (1-f) n_{clad}$$

Figure 7:
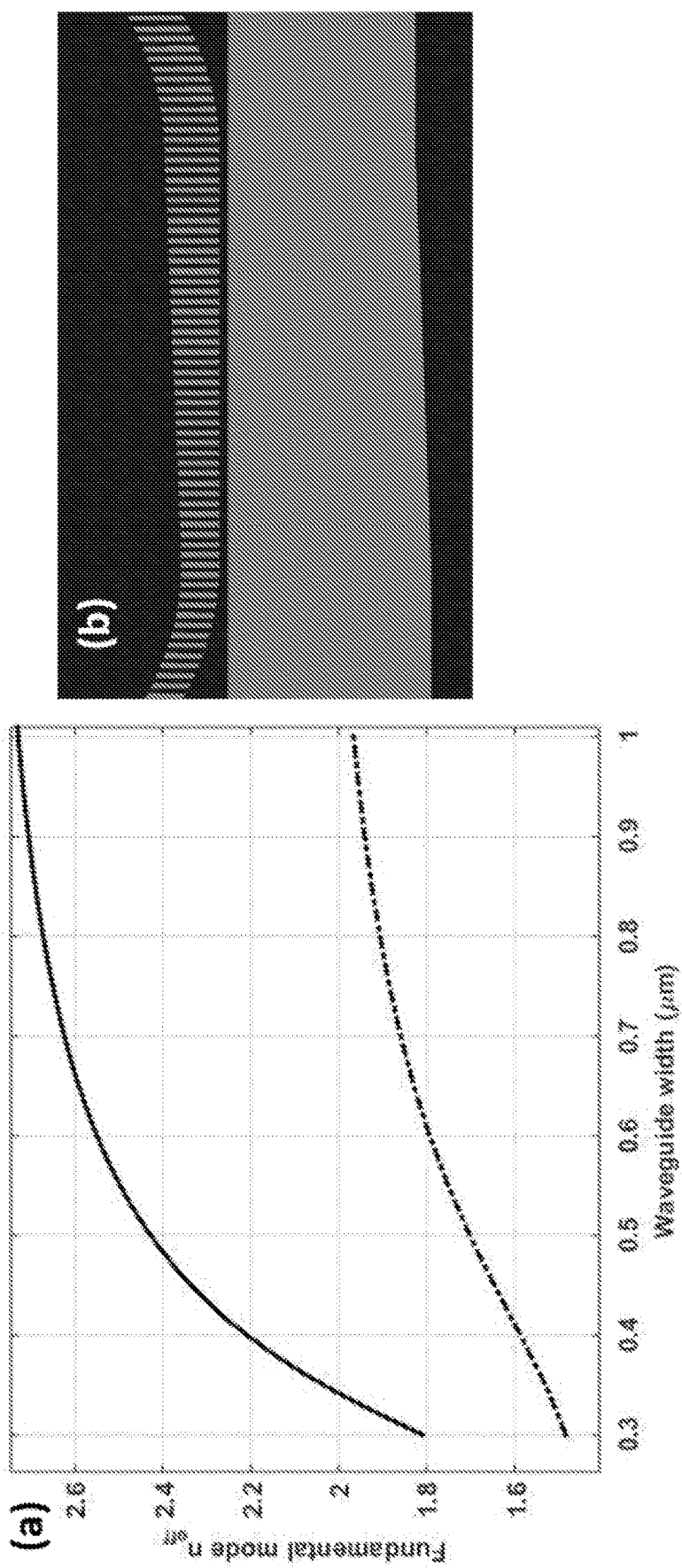
FIG. 7 (a) illustrates the effective index for the fundamental mode as a function of the waveguide width for the regular waveguide (upper solid line) and the SWG waveguide (lower dotted line). (b) Schematic for the ADC where the narrower waveguide is replaced by an SWG waveguide to increase tolerance to width variations.
Figure 8:
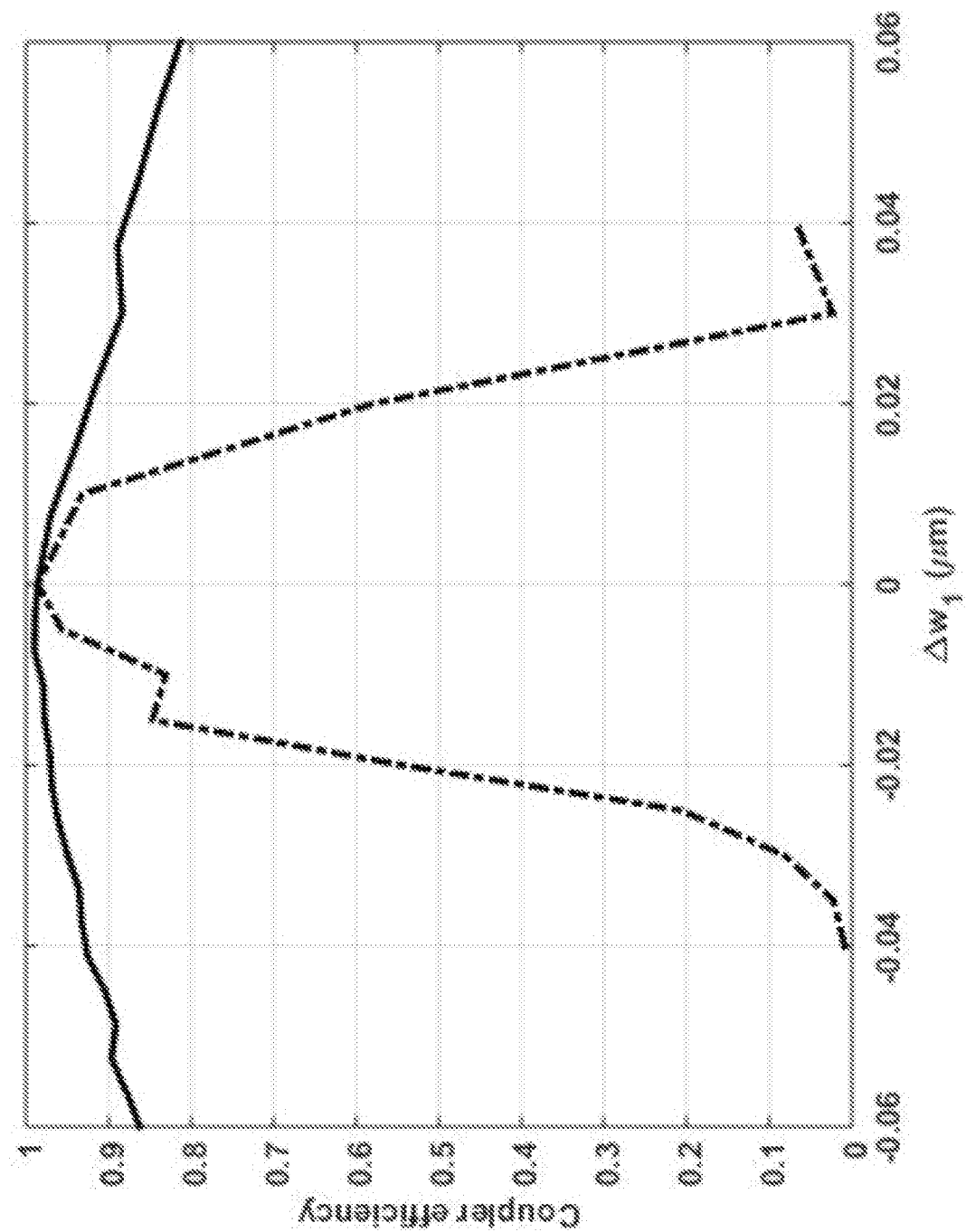
FIG. 8 illustrates tolerance to width variations for the regular design (lower dotted line) and the SWG design (upper solid line). Both designs used linear tapering. The SWG design is substantially more robust.

The effective index for the fundamental mode of regular and SWG waveguides is shown in FIG. 7(a). Note that the slope of the index vs width curve is much lower for the SWG waveguide—implying that it should be far less sensitive to waveguide width variations, thus making the couplers more robust. We designed ADCs with the waveguide for the fundamental mode being an SWG waveguide while the other one is a regular waveguide. The schematic of such a coupler is shown in FIG. 7(b). The tapering scheme is linear in this case, but it can be easily replaced by the more robust AE scheme as discussed above. The simulated tolerance of such a hybrid coupler to width variations is shown in FIG. 8. Clearly, it substantially outperforms the traditional design in terms of robustness to fabrication variations. Additionally, for the SWG design, the coupler length is smaller or equal to the design with regular waveguides because the stronger mode delocalization in the SWG waveguide means there is stronger coupling.

What is claimed is:

1. An integrated multipass photonic device comprising:
a bus waveguide; and
a first plurality of mode converter devices disposed at or adjacent a first end of the bus waveguide, and a second plurality of mode converter devices disposed at or adjacent a second end of the bus waveguide;
wherein each of the first plurality of mode converter devices is configured to receive light having one of a plurality of first modes along a first direction and to cause light having one of a plurality of second modes, different from the plurality of first modes, to propagate in a second direction opposite the first direction, and wherein each of the second plurality of mode converter devices is configured to receive the light having one of the plurality of second modes along the second direction and to cause the light having one of the plurality of the first modes to propagate in the first direction.

2. The device of claim 1, wherein the bus waveguide comprises a multilayer construction of differing materials including an optical waveguide core and cladding.

3. The device of claim 1, wherein one or more of the first plurality of mode converter devices comprises of one or more gratings.

4. The device of claim 1, wherein one or more of the first plurality of mode converter devices comprises of one or more electro-optic modulators.

5. The device of claim 1, wherein one or more of the first plurality of mode converter devices comprises of one or more polarization converters.

6. The device of claim 1, wherein one or more of the first plurality of mode converter devices comprises of one or more nonlinear elements.

7. The device according to claim 1, wherein each of the first plurality of mode converter devices is configured to promote one of the plurality of first modes to one of the plurality of second modes.

8. The device according to claim 7, wherein each of the first plurality of mode converter devices promotes one of the plurality of first modes by one.

9. The device according to claim 1, wherein the plurality of first modes comprises even numbered modes, and the plurality of second modes comprise odd numbered modes.

10. The device according to claim 1, further comprising an optical output for outputting output light from the bus waveguide.

11. The device according to claim 10, wherein the optical output comprises an output mode converter for converting the output light to a same mode as the light input the bus waveguide.

12. The device of claim 1, further comprising a heater for heating the bus waveguide.

13. An integrated multipass photonic device comprising:
a bus waveguide; and
at least one mode converter device disposed at or adjacent each of two opposing ends of the bus waveguide;
wherein each mode converter device is configured to receive light having a receiving mode along a first direction and to cause the light having a different mode from the receiving mode to propagate in a second direction opposite the first direction; and
wherein one or more of the mode converter devices comprises first and second directional couplers connected such that the light is picked up by the second directional coupler and is routed back to the first directional coupler and returned to the bus waveguide with the a different mode and a reversed direction.

14. The device according to claim 13, further comprising an optical output for outputting output light from the bus waveguide, and wherein the optical output comprises an output mode converter for converting the output light to a same mode as the light input the bus waveguide.

15. The device of claim 13, wherein the bus waveguide includes a variation in width such that a phase matching condition of the first directional coupler is satisfied only for a $TE_{i+1}$ mode of the bus waveguide, while the second directional coupler has a phase-matching condition only for a TE mode of the bus waveguide.

16. The device of claim 15, wherein the variation in width of the bus waveguide and a variation in a width of a narrow access waveguide of the directional couplers along a direction of propagation are configured to provide an adiabatic condition.

17. The device of claim 15, wherein the variation in width of the bus waveguide is linear, and wherein a variation in a width of a narrow access waveguide of the directional couplers is linear.

18. The device of claim 15, wherein the variation in width of the bus waveguide is non-linear, and wherein a variation in a width of a narrow access waveguide of the directional couplers is non-linear.

19. The device of claim 15, wherein the variation in width of the bus waveguide is based on a pre-determined function; and wherein a variation in a width of a narrow access waveguide of the directional couplers is based on the ft pre-determined function.

20. The device of claim 15, wherein a narrow access waveguide of the directional couplers is based on a sub-wavelength grating.

* * * * *